United States Patent

Knowles

[15] 3,672,697
[45] June 27, 1972

[54] MOTOR VEHICLE STEERING SYSTEM

[72] Inventor: James Knowles, Bloomfield Hills, Mich.

[73] Assignee: Ford Motor Company, Dearborn, Mich.

[22] Filed: July 6, 1970

[21] Appl. No.: 52,306

[52] U.S. Cl. ........................280/87 A, 74/495, 180/82, 280/150 B
[51] Int. Cl. ..........................B62d 1/18, B62d 1/20
[58] Field of Search ..........280/87, 87 A, 150 B; 74/492, 74/493, 495; 180/82, 79

[56] References Cited

UNITED STATES PATENTS

| | | | |
|---|---|---|---|
| 3,424,263 | 1/1969 | Black | 180/82 |
| 3,472,093 | 10/1969 | Tenniswood | 74/492 |
| 3,556,550 | 1/1971 | Franchini | 280/87 A |
| 3,524,656 | 8/1970 | Harford | 280/87 |

*Primary Examiner*—Benjamin Hersh
*Assistant Examiner*—John P. Silvertein
*Attorney*—John R. Faulkner and Clifford L. Sadler

[57] ABSTRACT

A steering system for a motor vehicle having a steering column and a steering gear. The column is supported, in part, by a bracket situated between the vehicle's fire wall and instrument panel. The column is also supported by the steering gear which, in turn, is secured by frangible means to the chassis frame. In the event of an impact load causing the collapse of the front vehicle structure, the gear separates from the frame and the column swings about its support on the bracket thereby causing the steering wheel to move away from its normal operating position.

11 Claims, 4 Drawing Figures

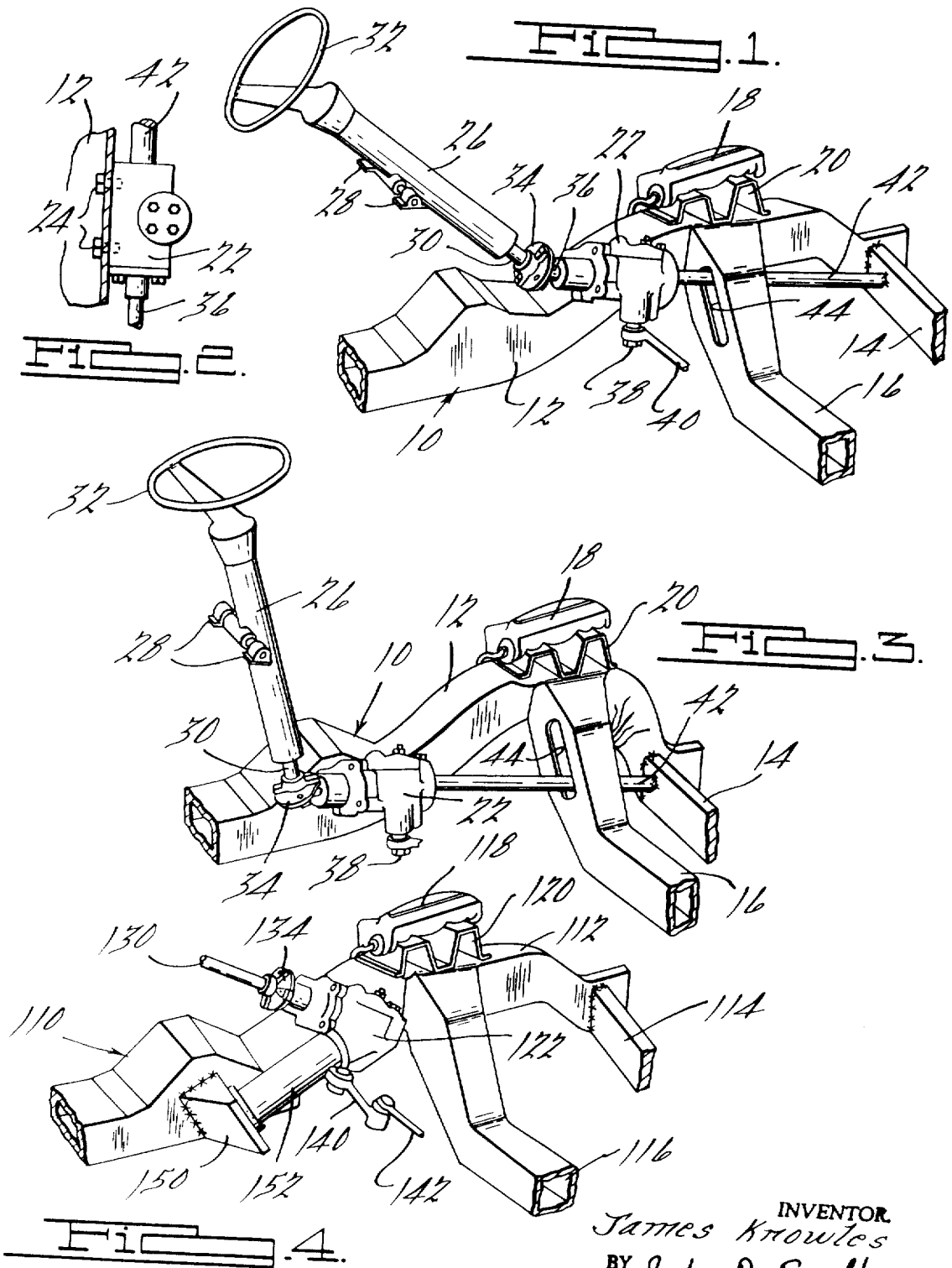

MOTOR VEHICLE STEERING SYSTEM

BACKGROUND OF THE INVENTION

This invention relates to a motor vehicle steering system, and more particularly it relates to a steering system in which the steering column is constructed to move out of its normal operating position upon collapse of front vehicle structure.

The present invention proposes a steering column and steering gear mounting means that are constructed to move the steering wheel and the upper end of the steering shaft in a direction (upwardly and forwardly relative to the instrument panel) away from their normal position in the event of an impact upon the front end of the vehicle that is of sufficient magnitude to cause collapse of the forward chassis frame structure.

BRIEF SUMMARY OF THE DISCLOSURE

In a presently preferred embodiment of this invention, a motor vehicle is provided with a steering system having a steering gear and a steering column. The column is supported on vehicle body structure by a bracket situated between the instrument panel and the fire wall. The steering gear is supported on the chassis frame by frangible mounting means. The column rotatably supports the steering shaft which, in turn, is connected to the steering gear at its lower end for additional support of the column. A steering wheel is connected to the upper end of the steering shaft in a conventional fashion.

The steering gear is normally spaced rearwardly of the forward limit of the vehicle frame. A force transmitting extension member has one end connected to the steering gear and its other end connected to the forwardmost portion of the frame.

In the event of a collapse of the front vehicle structure, deformation of the frame causes a force to be transmitted through the extension member to the steering gear. The frangible means securing the gear to the frame is constructed to fracture under the loading exerted upon it by the extension member. After the steering gear separates from the frame, the steering column is free to pivot about its support which is situated between the instrument panel and the fire wall. Rearward displacement of the steering gear and the concurrent swinging of the steering column causes the steering wheel and the upper end of the steering shaft to be moved out upwardly and forwardly from their normal driving position.

BRIEF DESCRIPTION OF THE DRAWINGS

The many objects and advantages of a steering system constructed in accordance with the present invention will become apparent upon consideration of the following description and the accompanying drawings, in which:

FIG. 1 is a perspective view of a portion of a vehicle chassis having a steering system embodying a preferred form of this invention;

FIG. 2 is a top plan view, partly in section, showing the mounting of the steering gear upon the chassis frame of FIG. 1;

FIG. 3 is a perspective view corresponding to FIG. 1 showing the relative position of the steering system components after plastic deformation of the forward frame components; and FIG. 4 is a perspective view of a portion of a vehicle chassis having a steering system constructed in accordance with an alternate embodiment of this invention.

DETAILED DESCRIPTION OF A PREFERRED EMBODIMENT

Referring now to FIG. 1, wherein a presently preferred embodiment of this invention is shown, a motor vehicle chassis includes a frame 10. The vehicle frame 10 comprises a left side rail 12 and a corresponding right side rail (not shown). First and second frame cross members 14 and 16 extend transversely of the vehicle and connect the left side rail 12 with the right side rail.

An upper suspension arm 18 is pivotally supported on a bracket 20 welded to the frame 10. The arm 18 constitutes one element of the vehicle suspension system.

The steering system includes a steering gear 22 that is supported on the frame rail 12 by frangible or shearable fasteners 24.

The steering system also includes a steering column assembly 26 having an outer tubular housing that is pivotally mounted on spaced brackets 28. The brackets 28 are secured to vehicle support structure such as reinforced sheet metal situated between the fire wall and the instrument panel of the vehicle.

A steering shaft 30 is rotatably supported within the tubular housing of the steering column assembly 26. A steering wheel 32 is connected to the upper end of the steering shaft. A flexible coupling 34, sometimes known as a rag joint, connects the lower end of the steering shaft to the input shaft 36 of the steering gear 22.

An output shaft 38 of the steering gear 22 is connected to the steering linkage of the vehicle by means of a Pitman arm 40.

A bar 42 has its forward end secured to the number one cross member 14 and its rearward end connected to the steering gear 22. As indicated in the drawing, the bar 42 extends through an opening 44 in the number two cross member 16. The bar 42 constitutes a force transmitting extension member as will become apparent from the following description of the operation of the device of FIGS. 1, 2 and 3.

OPERATION

In the event of a frontal impact of sufficient magnitude to cause the plastic deformation of front vehicle structure, the frame assembly 10 is deformed progressively rearwardly as the impact takes place. The first portion of the frame to be distorted is the forward end of the side rails, such as shown in FIG. 3 where the forward portion of the rail 12 is deformed as a result of impact.

The longitudinal loading upon the portion of the frame side rail 12 situated forwardly of the number two cross member 16 causes it to collapse with the result that the number one cross member 14 is driven rearwardly relative to frame member 16.

Rearward displacement of the number one cross member 14 is transmitted by means of the rod or bar 42 to the steering gear 22. If the impact is of sufficient magnitude, the bar will cause frangible fastening means 24 to be sheared and to force the gear 22 to be displaced rearwardly. This occurs as a result of the fact that during the initial phases of the progressive collapse of the frame 10, the cross member 14 will move rearwardly as the forward end of the side rail 12 is distorted relative to the portion of rail 12 adjacent the gear 22.

The steering column 26 includes the steering shaft 32 which is connected to the steering gear 22 and, therefore, the gear 22 normally constitutes a portion of the support of the column 26. When the gear 22 is driven rearwardly by the rod 24 (as shown in FIG. 3), the column 26 will be supported solely by the pivot means 28. The column 26 then will be free to pivot upwardly and forwardly, moving the steering wheel out of its normal operating position.

ALTERNATE EMBODIMENT

FIG. 4 shows an alternate embodiment of this invention wherein a frame assembly 110 includes a forward cross member 114 and a number two cross member 116 that are welded to the frame side rail 112. A suspension arm 118 is pivotally supported on the frame assembly 110 by means of a bracket 120.

A steering gear 122 is secured to the frame side rail 112 by means of shearable fasteners similar to the fasteners 24 of FIG. 2. A steering shaft 130 is connected to the input shaft of the steering gear 122 by a flexible coupling 134. A Pitman arm 140 is joined to the output shaft of the steering gear 122 and provides a connection between the gear 122 and the vehicle's steering linkage 142.

A rugged bracket member 150 is welded to the frame side rail 112 and has an extension member 152 connected thereto. The member 152 is of tubular construction and has its rearward end secured to bracket member 150 and its forward end positioned adjacent to the steering gear 122. The function of the bracket 150 and extension member 152 will become apparent from the following discussion of the operation of this alternate embodiment of the invention.

OPERATION OF ALTERNATE EMBODIMENT

In accordance with this embodiment of the invention, when an impact load is imposed upon the front of a vehicle having a steering system of FIG. 4, the frame 110 is deformed. This collapse of the frame structure occurs in a progressive fashion. Thus, the collapse of the side rail 112 will reach a stage where the portion adjacent the steering gear 122 has become distorted but the portion adjacent the bracket 150 has not. In such a situation, the support provided at the gear 122 by member 152 will cause the shearable fasteners connecting the rear 122 to the side rail 112 to be fractured.

Thus, as the frame side rail 112 distorts the steering gear 122 will be maintained in its position relative to the bracket 150 and will not be displaced rearwardly with respect thereto. Preferably, the bracket 150 is welded to the frame 110 at a particularly rugged point spaced a fair distance rearwardly of the steering gear 122.

By maintaining the integrity of the position of the steering gear 122, the shaft 130 will not be displaced rearwardly. Thus, intrusion of the steering shaft and the steering wheel rearwardly beyond their normal vehicle operating position will not occur.

As used in the foregoing description and the following claims, the terms frame or frame member refer to vehicle structure whether formed as support members separate from the vehicle body or as components integral with vehicle body sheet metal.

The foregoing description presents the presently preferred embodiment of this invention. Modifications and alterations may occur to those skilled in the art that will come within the scope and spirit of the following claims:

I claim:

1. A steering system for a motor vehicle comprising a vehicle body, a supporting frame having first and second frame portions, a steering gear box, a steering column supported in said vehicle body, said column rotatably supporting a steering shaft, a steering wheel connected to the upper end of said shaft, coupling means joining the lower end of said steering shaft to an input shaft of said gear box, frangible fastening means securing said gear box rigidly to said first frame portion, rigid means extending generally longitudinally of said vehicle and having one end connected to said second frame portion and its other end connected to said gear box, said second frame portion being longitudinally spaced apart from said first frame portion and said gear box, said rigid means being constructed to cause said frangible means to be fractured and to force the separation of said steering gear box and said first frame portion when the distance between said first and second frame portions is decreased.

2. A steering system for a motor vehicle according to claim 1 and including:
said first portion being disposed rearwardly in said vehicle of said second portion whereby said longitudinally extending means displaces said steering gear rearwardly relative to said first portion when said second portion is displaced.

3. A steering system for a motor vehicle according to claim 1 and including:
support means supporting said column in said vehicle for pivotal movement, a flexible coupling connecting the lower end of said steering shaft to said steering gear box, said first frame portion being situated in said vehicle at a location rearwardly of said second frame portion, said force transmitting means being constructed to displace said gear rearwardly relative to said first frame portion and to pivot said column about said support means when said second frame portion is displaced rearwardly relative to said first frame portion.

4. A steering system for a motor vehicle according to claim 1 and including:
support means supporting said steering column in said body, said rigid means being further constructed to angularly displace said steering column about said support means with the consequent displacement of said steering wheel upwardly and forwardly in said body in response to the plastic deformation of the forward portion of said frame.

5. A steering system for a motor vehicle according to claim 1 and including:
support means connecting said steering column to said body, said rigid means having its said one end connected to said second frame portion forwardly of said gear box, said rigid means being constructed to displace said gear box rearwardly when said second frame portion is displaced rearwardly in a direction toward said gear box and thereby cause said steering column to be angularly displaced about said support means with the consequent displacement of said steering wheel upwardly and forwardly in said body.

6. A steering system for a motor vehicle according to claim 1 and including:
support means supporting said column in said body for pivotal movement, a flexible coupling connecting the lower end of said steering shaft to said steering gear box, said first frame portion being situated in said vehicle at a location rearwardly of said second frame portion, said rigid means being constructed to displace said gear rearwardly relative to said first portion and to pivot said column about said support means when said second frame portion is displaced rearwardly relative to said first frame portion.

7. A steering system for a motor vehicle comprising a vehicle body, a supporting frame, a steering gear box, a steering column supported in said vehicle body, said column rotatably supporting a steering shaft, a steering wheel connected to the upper end of said shaft, coupling means joining the lower end of said shaft to said gear box, frangible means connecting said gear box to a first portion of said frame, rigid longitudinally extending means having one end connected to a second portion of said frame and its other end connected to said gear box, said first and second portions of said frame being longitudinally spaced apart, said longitudinally extending means being constructed to cause said frangible means to be fractured and to force the separation of said steering gear box and said first portion of said frame when the distance between said first and second portions of said frame is decreased, said first portion of said frame being disposed forwardly in said vehicle of said second portion of said frame whereby said longitudinally extending means maintains the integrity of the position of said steering gear box relative to said second portion of said frame when said first portion of said frame is displaced.

8. A steering system for a motor vehicle having a vehicle body comprising a frame, steering means including a steering gear box and a steering column, said column rotatably supporting a steering shaft, a steering wheel connected to the upper end of said shaft, coupling means connecting said steering gear to the lower end of said steering shaft, mounting means supporting said steering means, said mounting means including support means supporting said steering column in said body and frangible means connecting said steering gear to a first portion of said frame, rigid longitudinally extending support means having one end connected to said gear box and its other end connected to a second portion of said frame situated rearwardly of said gear box, said longitudinally extending support means being constructed to support said gear box against rearward displacement when said first portion of said frame is displaced in a rearward direction relative to said second portion and thereby cause said frangible means to be fractured.

9. A steering system for a motor vehicle comprising a supporting frame having longitudinally spaced apart first and second frame portions, a steering gear box, means supporting said gear box on said frame in substantially closer proximity to said first frame portion than said second frame portion, force transmitting means connected to said second frame portion, said force transmitting means being constructed to force the displacement of said gear box relative to said first frame portion when the spacing between said second frame portion and said first frame portion is reduced.

10. A steering system for a motor vehicle according to claim 4 and including:

support means supporting said steering column in said vehicle, said force transmitting means being further constructed to angularly displace said steering column about said support means with the consequent displacement of said steering wheel upwardly and forwardly in said body in response to the plastic deformation of the forward portion of said frame.

11. A steering system for a motor vehicle according to claim 4 and including:

support means connecting said steering column to said vehicle, said force transmitting means having one end connected to said second frame portion forwardly of said gear box, said force transmitting means being constructed to displace said gear box rearwardly when said second frame portion is displaced rearwardly in a direction toward said gear box and thereby cause said steering column to be angularly displaced about said support means with the consequent displacement of said steering wheel upwardly and forwardly in said body.

* * * * *